(12) United States Patent
Semper et al.

(10) Patent No.: US 7,457,266 B2
(45) Date of Patent: Nov. 25, 2008

(54) SYSTEM AND METHOD FOR ROUTING DATA PACKETS IN A 1XEV-DV WIRELESS NETWORK

(75) Inventors: William J. Semper, Richardson, TX (US); Purva R. Rajkotia, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 1076 days.

(21) Appl. No.: 10/222,084

(22) Filed: Aug. 16, 2002

(65) Prior Publication Data

US 2004/0033816 A1 Feb. 19, 2004

(51) Int. Cl.
*H04Q 7/00* (2006.01)

(52) U.S. Cl. .................................. 370/331

(58) Field of Classification Search ......... 370/328–334, 370/335
See application file for complete search history.

(56) References Cited

U.S. PATENT DOCUMENTS

| | | | | |
|---|---|---|---|---|
| 6,085,089 | A * | 7/2000 | Emmer et al. | 455/439 |
| 6,519,457 | B1 * | 2/2003 | Jiang et al. | 455/442 |
| 6,553,015 | B1 * | 4/2003 | Sato | 370/331 |
| 6,580,699 | B1 * | 6/2003 | Manning et al. | 370/331 |
| 6,707,803 | B1 * | 3/2004 | Suk | 370/331 |
| 6,731,993 | B1 * | 5/2004 | Carter et al. | 700/94 |
| 6,779,039 | B1 * | 8/2004 | Bommareddy et al. | 709/238 |
| 6,907,016 | B2 * | 6/2005 | Madour et al. | 370/331 |
| 6,959,190 | B2 * | 10/2005 | Choi et al. | 455/442 |

\* cited by examiner

*Primary Examiner*—Chau Nguyen
*Assistant Examiner*—Marcus R Smith

(57) ABSTRACT

A base station for use in a wireless network capable of communicating with mobile stations located in a coverage area of the wireless network. The base station comprises a first base station controller (BSC) that receives data packets from a content server via a packet data network coupled to the first BSC and transmits the received data packets to a first one of the mobile stations via a first base transceiver subsystem (BTS) associated with the first BSC. The first BSC, in response to a first control message received from a second BSC, forwards the received data packets to the second BSC for subsequent transmission to the first mobile station.

17 Claims, 3 Drawing Sheets

SYSTEM AND METHOD FOR ROUTING DATA PACKETS IN A 1XEV-DV WIRELESS NETWORK

TECHNICAL FIELD OF THE INVENTION

The present invention is directed, in general, to wireless networks and, more specifically, to a system for efficiently routing data packets between base stations of a 1xEV-DV wireless network.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

In order to attract and retain subscribers, wireless service provider frequently introduce end-user services that are desirable to consumers. These end-user services may include packet data services that enhance Internet service in wireless networks. There are two enhancements to the CDMA 2000 air interface: 1xEV-DO (defined by TIA IS-856) and 1xEV-DV (defined by TIA IS-2000-C). These new air interface standards enable high-speed packet data delivery to a mobile station to occur more efficiently and with higher data rates than currently available systems using CDMA2000 (also called 3G-1x). The two key improvements in the 1xEV-DV/DO protocol:

1) Instead of assigning a dedicated Supplemental Channel (SCH) to each user for packet data delivery, the 1xEV-DV/DO protocol uses a single-high speed Packet Data Channel (PDCH) that is shared between users. Under the 1xEV-DO protocol, user traffic is multiplexed onto the channel using Time Division Multiplexing (TDM). Under the 1xEV-DV protocol, user traffic may be multiplexed onto the channel using Time Division Multiplexing (TDM) and Code Division Multiplexing (CDM). This allows each user to receive the highest data rate available when they have access to the channel.

2) In the 1xEV-DV protocol, the mobile station indicates to the network which base station the mobile station wants to receive the data burst from. This is a change from 3G-1x, where the mobile sends Pilot Strength Measurement Messages to the network and the network chooses which base station to use for the data burst transmissions to the mobile station.

These changes require new functionality in wireless network base stations. Currently, in the 3G-1x system, users are allocated dedicated traffic channels by a source (or anchor) base station controller (BSC). A dedicated connection is established between the source BSC and any one or more target BSCs that are currently in the active set of the mobile station (as indicated to the source BSC by Pilot Strength Measurement messages transmitted by the mobile station). There is a separate connection for each dedicated traffic channel used by a subscriber. As data arrives at the source BSC for different users, the source BSC schedules traffic channel (e.g., supplemental Channel (SCH)) assignments between subscribers and sends the appropriate control signals to the target BSCs. Once the SCH(s) have been assigned, the source BSC forwards data to the appropriate target BSC.

The above-described centralized approach to distributing packet data traffic is time consuming and requires a large amount of control signaling between the source BSC and the target BSCs before data can actually be sent to the mobile station. Subscriber data rates are limited by the data rates of the dedicated traffic channels and the number of other users being served in the same sector.

There is therefore a need in the art for improved systems and methods for routing packet data between base stations in a wireless network. In particular, there is a need in the art for improved systems and methods for routing packet data between a source (or anchor) base station controller (BSC) and one or more target base station controllers. More particularly, there is a need for a packet data router that more efficiently transfers data packets between a source BSC and at least one target BSC.

SUMMARY OF THE INVENTION

To address the above-discussed deficiencies of the prior art, it is a primary object of the present invention to provide an improved base station for use in a wireless network capable of communicating with mobile stations located in a coverage area of the wireless network. According to an advantageous embodiment, the base station comprises a first base station controller (BSC) operable to receive data packets from a content server via a packet data network coupled to the first BSC and to transmit the received data packets to a first one of the mobile stations via a first base transceiver subsystem (BTS) associated with the first BSC, wherein the first BSC, in response to a first control message received from a second base station controller (BSC), is capable of forwarding the received data packets to the second BSC for subsequent transmission to the first mobile station.

According to one embodiment of the present invention, the first BSC, in response to the first control message received from the second BSC, is further capable of terminating transmission of the received data packets from the first BTS to the first mobile station.

According to another embodiment of the present invention, the second BSC transmits the first control message in response to a second control message transmitted by the first mobile station to a second base transceiver subsystem (BTS) controlled by the second BSC.

According to still another embodiment of the present invention, the second control message indicates the first mobile station is selecting the second BTS to transmit the received data packets to the first mobile station.

According to yet another embodiment of the present invention, the first BSC transmits the received data packets to the second BSC via a dedicated network connection.

According to a further embodiment of the present invention, the dedicated network connection is a shared connection whereby the first BSC transmits the received data packets to the second BSC for subsequent transmission to the first mobile station and to a second mobile station.

According to a still further embodiment of the present invention, the first BSC uses first identification information associated with the first mobile station to identify first selected ones of the received data packets to be transmitted to the first mobile station by the second BSC and further uses second identification information associated with the second mobile station to identify second selected ones of the received data packets to be transmitted to the second mobile station by the second BSC.

According to a yet further embodiment of the present invention, the first BSC comprises a routing controller capable of maintaining mapping information indicating that received data packets directed to the second mobile station are to be transmitted by the second BSC.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
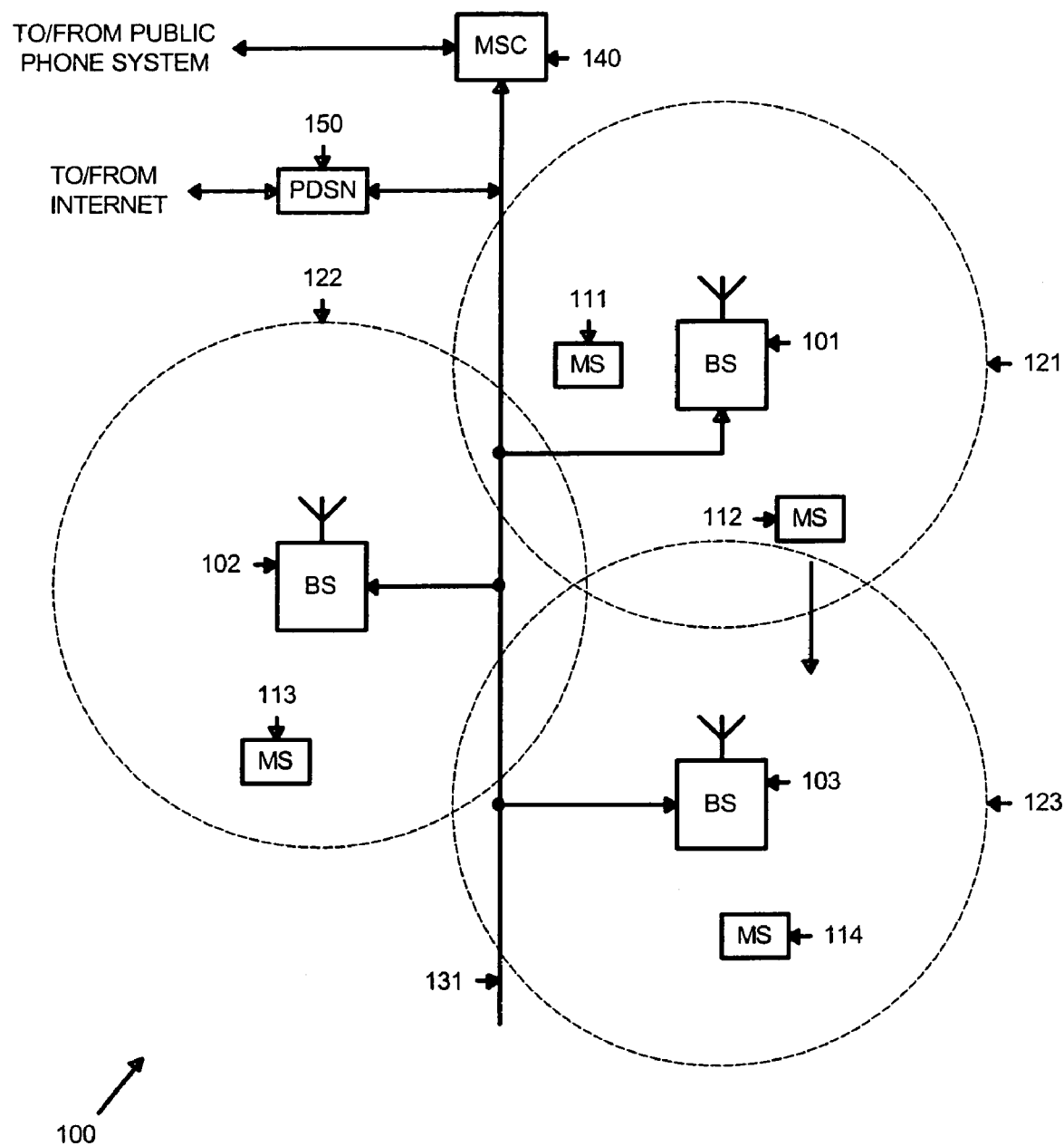
FIG. 1 illustrates an exemplary 1xEV-DV wireless network according to one embodiment of the present invention.
Figure 2:
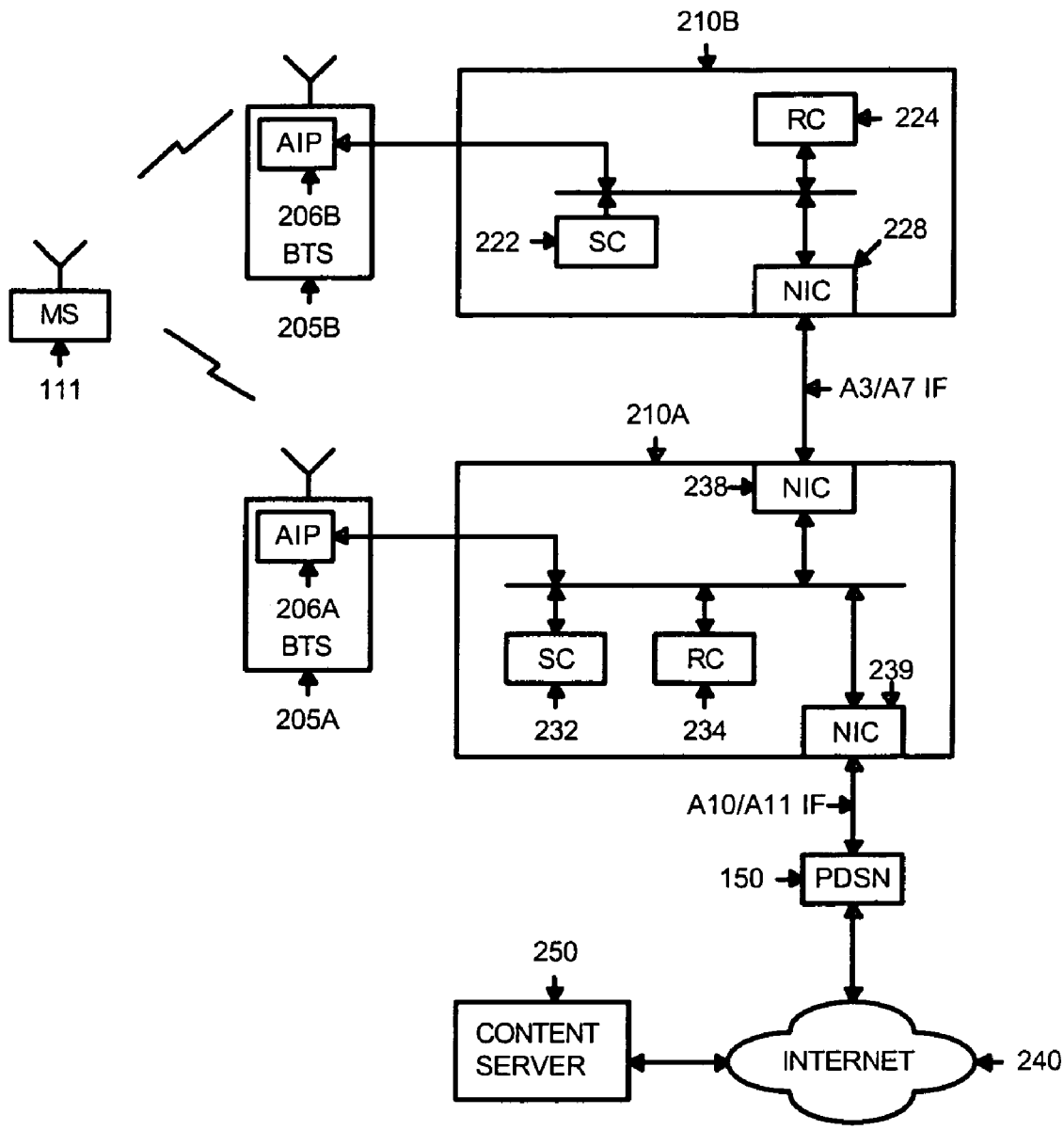
FIG. 2 illustrates selected portions of base station controllers and base transceiver subsystems operable to coordinate the routing of data packets according to one embodiment of the present invention.
Figure 3:
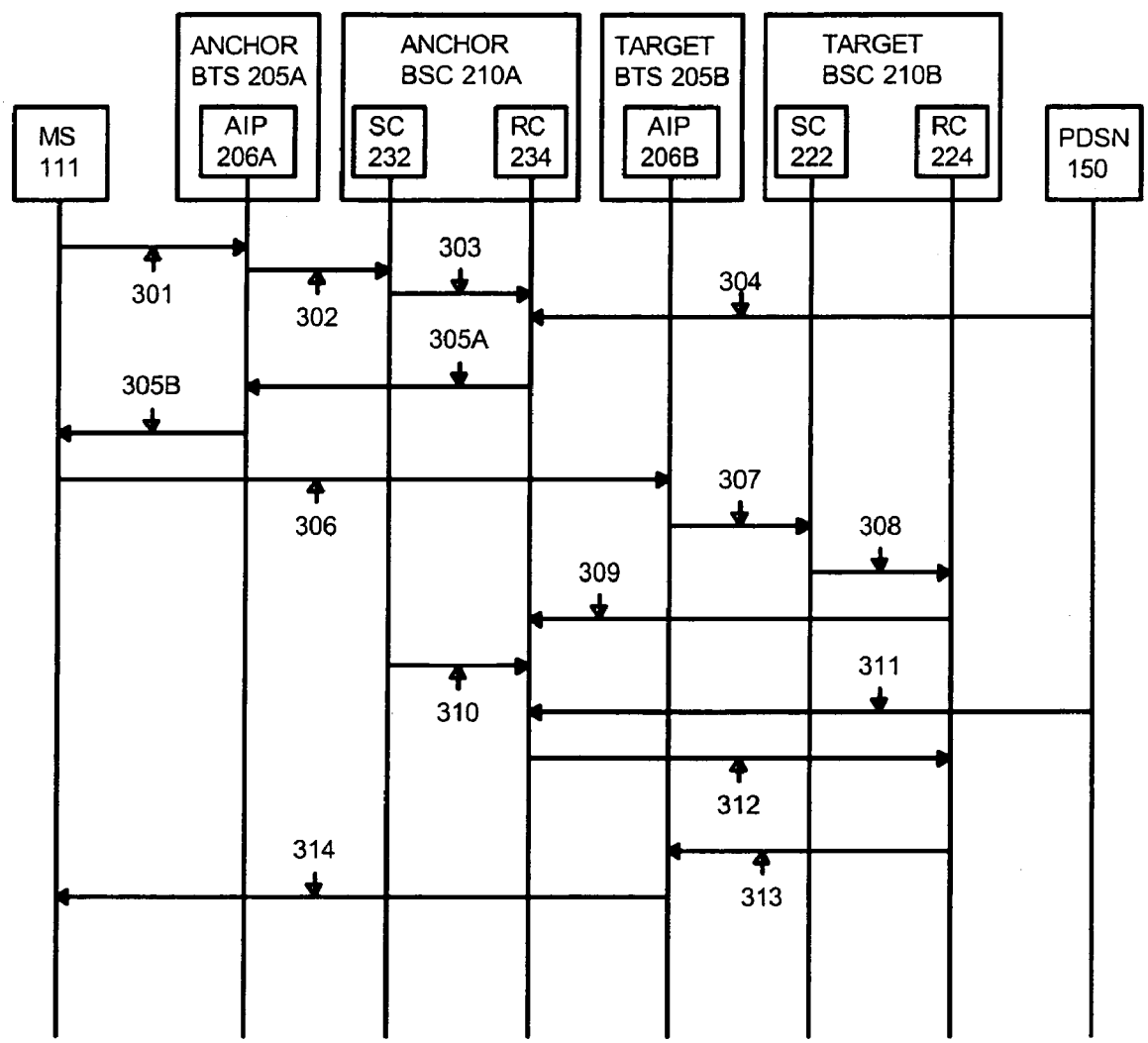
FIG. 3 is a message flow diagram illustrating a packet data routing operation according to an exemplary embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates exemplary wireless network 100 according to one embodiment of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over, for example, code division multiple access (CDMA) channels. Mobile stations 111-114 may be any suitable wireless devices, including conventional cellular radiotelephones, PCS handset devices, personal digital assistants, portable computers, or metering devices. The present invention is not limited to mobile devices. Other types of access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), each sector being illuminated by a directional antenna coupled to the base station. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center MSC) 140. BS 101, BS 102 and BS 103 also transfer data signals, such as packet data, with the Internet (not shown) via communication line 131 and packet data serving node (PDSN) 150. Line 131 also provides the connection path to transfers control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may a provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft hand-off assumes the mobile station is in a voice or data call. An idle hand-off is a hand-off of a mobile station, between cells sites, that is communicating in the control or paging channel.

According to an advantageous embodiment of the present invention, mobiles stations 111-114 are capable of accessing Internet content servers (i.e., web sites) via base stations 101-103 and PDSN 150. To enable this functionality, base stations 101-103 provide conventional packet data services between mobile station 111-114 and the packet data network.

FIG. 2 illustrates selected portions of base station controllers 210A and 210B and base transceiver subsystems (BTSs) 205A and 205B operable to coordinate the routing of data packets according to one embodiment of the present invention. BSC 210B comprises signaling controller (SC) 222, routing controller (RC) 224, and network interface card (NIC) 228. BSC 210A comprises signaling controller (SC) 232, routing controller (RC) 234, and network interface cards (NICs) 238 and 239. BTS 205A comprises air interface processing (AIP) block 206A and BTS 205B comprises air interface processing (ATP) block 206B.

The routing controllers 224 and 234 route the incoming packet data to the appropriate BTS/BSC (based upon messages received from the BTSs). Routing controllers 224 and 234 are also responsible for marking the bearer frames which are being sent to the target BTS/BSC to indicate for which subscriber (i.e., mobile station) the data is intended. This is a significant function, because in conventional prior art implementations there is a separate connection to the target BSC/BTS for each subscriber. In the improved EV-DV implementation, there is a single connection for the high-speed data channel and the packet data must be tagged to differentiate between subscriber mobile stations.

According to an advantageous embodiment of the present invention, routing controllers 224 and 234 are software blocks that operate on one or more existing call processors in BSC 210B and BSC 210A. In an alternate embodiment of the present invention, routing controllers 224 and 234 may operate on one or more new dedicated processors, depending on implementation details. More generally, each of the blocks in BSC 210A, BSC 210B, BTS 205A and BTS 205B may represent logic entities (i.e., software blocks), rather than hardware entities (i.e., data processors/data controllers).

Each routing controller (RC) is a software block that operates in a base station controller, either a source (anchor) BSC or a target BSC. Each RC is connected to the signaling controller (SC) block that creates control signaling messages for the inter-BSC and BTS interfaces. According to an exemplary embodiment, the inter-BSC interface (IF) is an A3/A7 interface (IF), while the network interface to PDSN 150 is an A10/A11 interface (IF). These interfaces are defined in the TIA IS-2001 standard. PDSN 150 acts as a router, forwarding data packets to and from content server 250 via Internet 240 (or some other packet data network).

Air interface processing (AIP) blocks 206A and 206B interpret air interface link quality information being transmitted by mobile station (MS) 111. AIP blocks 206A and 206B signal RC 234 and RC 224, respectively, when MS 111 is indicating that a sector controlled by BTS 205A or BTS 205B is the preferred sector from which to receive forward link data packets. AIP blocks 206A and 206B also multiplex subscriber data for several mobile stations onto the packet data traffic channel.

FIG. 3 illustrates message flow diagram 300, which depicts a packet data routing operation according to an exemplary embodiment of the present invention. FIG. 3 indicates an example of the message flow that would ensue when mobile station (MS) 111, acting in EV-DV mode, wants to receive a forward link data burst. It is assumed that the call is initially anchored on anchor BSC 210A and that the active set of MS 111 contains pilot channel signals active on sectors supported by base transceiver subsystems (i.e., anchor BTS 205A and target BTS 205B) controlled by anchor BSC 210A and target BSC 210B. Initially, forward link data packets for mobile station 111 are arriving from PDSN 150 via anchor BSC 210A. It is also assumed that an A3 connection has been provisioned between anchor BSC 210A and target BSC 210B for the packet data channel supported by EV-DV. This is a permanent connection used by all packet users supporting EV-DV and is defined in the TIA IS-2001 standard.

Initially, mobile station 111 transmits message 301 (e.g., a is DRC message) to AIP block 206A in anchor BTS 205A, indicating that MS 111 wants to receive data from a sector under the control of anchor BTS 205A. AIP block 206A interprets message 301 and sends message 302 to SC 232 in anchor BSC 210A indicating that MS 111 is in a sector within the control of anchor BTS 205A.

Next, SC 232 sends message 303 to RC 234 in anchor BSC 210A indicating that all data for MS 111 should be routed to the indicated cell on anchor BTS 210A. Thereafter, incoming data (represented by message 304) is routed from PDSN 150 to anchor BSC 210A, where the call is anchored. The data in message 304 arrives at RC 234 on an A10 interface associated with mobile station 111. This can be done using either IP-based networks or ATM-based networks. In either case, RC 234 knows to which address (IP or ATM CID) to send the data packets.

Since RC 234 contains the mapping between A10 connections and current cells associated with the call, RC 234 routes the data in message 305A to the indicated cell on anchor BTS 205A, where it is multiplexed onto the packet data traffic channel by AIP block 206A and transmitted in air interface message 305B to MS 111.

It is noted that RC 234 must mark each data packet with subscriber identification associated with MS 111, so that AIP block 206A knows for which mobile station the data is intended. This is because there is only one address for AIP block 206A that controls the current active sector and all mobiles in that sector use that address. The subscriber identification marking may be the IMSI of mobile station (MS) 111, or a special identifier assigned by RC 234 during the call and communicated to all RCs in BSCs that contain cells in the active set of MS 111.

At some later point in time, MS 111 transmits message 306, which points its DRC to target BTS 205B, indicating that a cell within the control of target BTS 205B is the desired cell for forward link transmission. In response, AIP block 206B in target BTS 205B interprets message 306 and transmits message 307 to SC 222 in target BSC 210B. Message 307 indicates target BTS 205B now controls the current preferred cell for MS 111.

SC 222 in target BSC 210B transmits message 308 to RC 224 in target BSC 210B indicating that RC 224 will soon be receiving data for MS 111 from anchor BSC 210A over an already established A3 connection. SC 222 in target BSC 210B transmits message 309 to SC 232 in anchor BSC 210A indicating that target BSC 210B now controls the preferred cell for MS 111. SC 232 in anchor BSC 210A responds by transmitting message 310 to RC 234 in anchor BSC 210A. Message 310 indicates that all forward link data for MS 111 should now be routed to RC 224 in target BSC 210B over the existing A3 connection.

Thereafter, incoming data for MS 111 continues to be received by RC 234 in anchor BSC 210A, as indicated by message 311. In response, RC 234 in anchor BSC 210A routes (forwards) the data packets to RC 224 in target BSC 210B via message 312 over an existing A3 connection (provisioned when the network was set up). RC 234 in anchor BSC 210A uses the mobile station identifier to mark each frame of data packets RC 234 sends to target BSC 210B to indicate for which mobile station the data is intended. When the data arrives at RC 224 in target BSC 210B, the data packets are routed (based on the mobile identifier) to the correct cell in target BTS 205B via message 313. The data packets are then multiplexed into the F-PDCH by AIP block 206B in target BTS 205B and transmitted to MS 111 via message 314.

The present invention allows for RAN support of the 1xEV-DV air interface and, in particular, forward packet data transmission on that interface. The approach outlined in 1xEV-DV provides speed and efficiency advantages over existing systems in which the base station decides which cell transmits data and informs the mobile station. The mobile station can quickly signal wireless network 100 (by changing its DRC) to indicate which cell is best for receiving the data burst and wireless network 100 simply needs to route the data to the correct cell. This also reduces the complexity of the pilot strength algorithms which the base station must execute if the base station is making the decision. Since the mobile makes this decision, the base station computation is much simpler. The base station simply routes the data to the correct cell. The invention provides network support of the 1xEV-DV standard and improves high speed packet data services to the subscriber.

Although the present invention has been described in detail, those skilled in the art should understand that they can make various changes, substitutions and alterations herein without departing from the spirit and scope of the invention in its broadest form.

What is claimed is:

1. A base station for use in a wireless network capable of communicating with mobile stations located in a coverage area of said wireless network, said base station comprising:

a first base station controller (BSC) operable to receive data packets from a content server via a packet data network coupled to said first BSC and to transmit said received data packets to a first one of said mobile stations via a first base transceiver subsystem (BTS) associated with said first BSC, wherein said first BSC, in response to a first control message received from a second base station controller (BSC) and first identification information associated with said first mobile station identifying said received data packets to be transmitted to said first mobile station, is capable of forwarding said received data packets to said second BSC for subsequent transmission to said first mobile station, and wherein said second BSC transmits said first control message in response to a second control message transmitted by said first mobile station to a second base transceiver subsystem (BTS) controlled by said second BSC and said second control message indicates said first mobile station is selecting said second BTS to transmit said received data packets to said first mobile station.

2. The base station as set forth in claim 1 wherein said first BSC, in response to said first control message received from said second BSC, is further capable of terminating transmission of said received data packets from said first BTS to said first mobile station.

3. The base station as set forth in claim 1 wherein said first BSC transmits said received data packets to said second BSC via a dedicated network connection.

4. The base station as set forth in claim 3 wherein said dedicated network connection is a shared connection whereby said first BSC transmits said received data packets to said second BSC for subsequent transmission to said first mobile station and to a second mobile station.

5. The base station as set forth in claim 4 wherein said first BSC uses second identification information associated with said second mobile station to identify second selected ones of said received data packets to be transmitted to said second mobile station by said second BSC.

6. The base station as set forth in claim 5 wherein said first BSC comprises a routing controller capable of maintaining mapping information indicating that received data packets directed to said second mobile station are to be transmitted by said second BSC.

7. A wireless network comprising:
a plurality of base stations capable of communicating with mobile stations located in a coverage area of said wireless network, wherein at least one of said plurality of base stations comprises:
a first base station controller (BSC) operable to receive data packets from a content server via a packet data network coupled to said first BSC and to transmit said received data packets to a first one of said mobile stations via a first base transceiver subsystem (BTS) associated with said first BSC, wherein said first BSC, in response to a first control message received from a second base station controller (BSC) and first identification information associated with said first mobile station identifying first selected ones of said received data packets to be transmitted to said first mobile station, is capable of forwarding said received data packets to said second BSC for subsequent transmission to said first mobile station, and wherein said second BSC transmits said first control message in response to a second control message transmitted by said first mobile station to a second base transceiver subsystem (BTS) controlled by said second BSC and said second control message indicates said first mobile station is selecting said second BTS to transmit said received data packets to said first mobile station.

8. The wireless network as set forth in claim 7 wherein said first BSC, in response to said first control message received from said second BSC, is further capable of terminating transmission of said received data packets from said first BTS to said first mobile station.

9. The wireless network as set forth in claim 7 wherein said first BSC transmits said received data packets to said second BSC via a dedicated network connection.

10. The wireless network as set forth in claim 9 wherein said dedicated network connection is a shared connection whereby said first BSC transmits said received data packets to said second BSC for subsequent transmission to said first mobile station and to a second mobile station.

11. The wireless network as set forth in claim 10 wherein said first BSC uses second identification information associated with said second mobile station to identify second selected ones of said received data packets to be transmitted to said second mobile station by said second BSC.

12. The wireless network as set forth in claim 11 wherein said first BSC comprises a routing controller capable of maintaining mapping information indicating that received data packets directed to said second mobile station are to be transmitted by said second BSC.

13. For use in a base station of a wireless network capable of communicating with mobile stations located in a coverage area of the wireless network, a method of routing data packets directed to a first mobile station comprising the steps of:
in a first base station controller (BSC), receiving data packets from a content server via a packet data network coupled to the first BSC;
transmitting the received data packets to the first mobile station via a first base transceiver subsystem (BTS) associated with the first BSC; and
in response to a first control message and first identification information associated with the first mobile station identifying first selected ones of the received data packets to be transmitted to the first mobile station received from a second base station controller (BSC), forwarding the received data packets to the second BSC for subsequent transmission to the first mobile station,
wherein said second BSC transmits said first control message in response to a second control message transmitted by said first mobile station to a second base transceiver subsystem (BTS) controlled by said second BSC and said second control message indicates said first mobile station is selecting said second BTS to transmit said received data packets to said first mobile station.

14. The method as set forth in claim 13 further comprising the step, in response to the first control message received from the second BSC, of terminating transmission of the received data packets from the first BTS to the first mobile station.

15. The method as set forth in claim 13 wherein the first BSC transmits the received data packets to the second BSC via a dedicated network connection.

16. The method as set forth in claim 15 wherein the dedicated network connection is a shared connection whereby the first BSC transmits the received data packets to the second BSC for subsequent transmission to the first mobile station and to a second mobile station.

17. The method as set forth in claim 16 wherein the first BSC uses second identification information associated with the second mobile station to identify second selected ones of the received data packets to be transmitted to the second mobile station by the second BSC.

* * * * *